United States Patent [19]

Kimura

[11] 4,305,269

[45] Dec. 15, 1981

[54] OIL HYDRAULIC BULGE-FORMING PROCESS FOR THE MANUFACTURE OF FRONT FORK BLANK OF SINGLE UNIT TYPE FOR BICYCLES

[76] Inventor: Isao Kimura, 125, 14-23, Shiratori 4-chome, Katsushika-ku, Tokyo, Japan

[21] Appl. No.: 101,254

[22] Filed: Dec. 7, 1979

[30] Foreign Application Priority Data

Sep. 27, 1979 [JP] Japan ............................ 54-123289

[51] Int. Cl.$^3$ ............................................ B21D 39/08
[52] U.S. Cl. ...................................... 72/58; 72/61; 29/421 R
[58] Field of Search .................. 72/57, 58, 60, 61, 62; 29/421 R

[56] References Cited

U.S. PATENT DOCUMENTS

| | | | |
|---|---|---|---|
| 588,804 | 8/1897 | Porish | 72/61 |
| 2,770,874 | 11/1956 | Lindow | 72/62 |
| 3,564,886 | 2/1971 | Nakamura | 72/62 |
| 4,047,412 | 9/1977 | Holmgren | 72/58 |
| 4,051,704 | 10/1977 | Kimura | 72/58 |

*Primary Examiner*—Leon Gilden
*Attorney, Agent, or Firm*—Wenderoth, Lind & Ponack

[57] ABSTRACT

A straight tubular ferrous blank of a circular section, starting material of the invention is deformed in its section along its whole length and bent to form a fork with two legs or blades, the thus formed tubular fork is set in a sectional forming die of top and bottom molds; the die has a concave corresponding to a protuberant socket and has also at its end an opening into which a mandrel having a recess corresponding to the same protuberant socket is introduced; the tubular fork set in the sectional die is subjected to the oil hydraulic bulge-forming process together with the mandrel simultaneously forced into the opening to bulge-form the socket, and the desired front fork blank of the single unit type is obtained.

4 Claims, 11 Drawing Figures

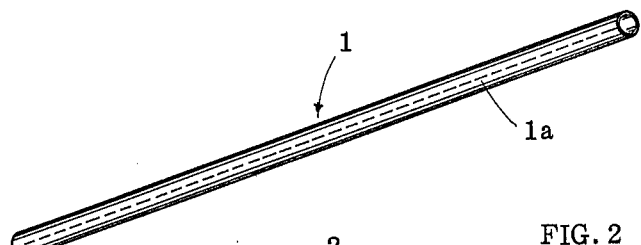
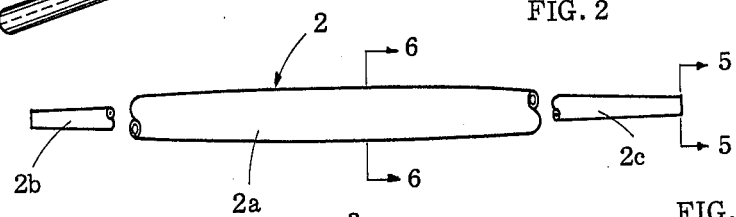
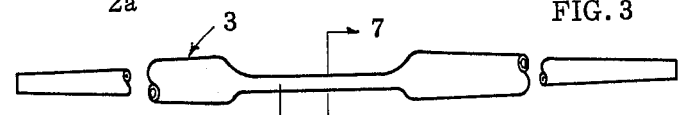
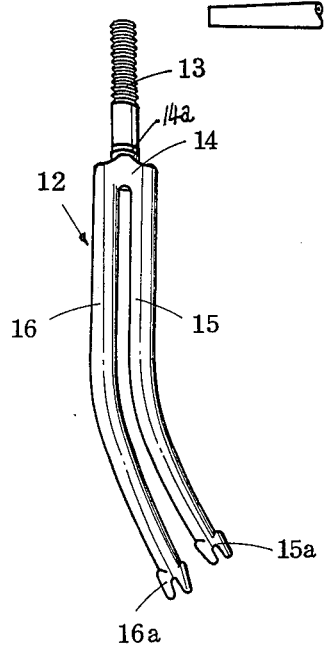
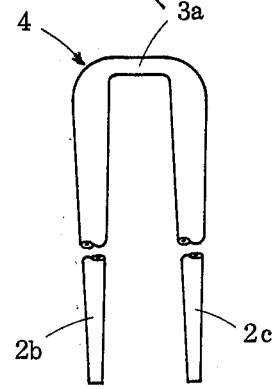

OIL HYDRAULIC BULGE-FORMING PROCESS FOR THE MANUFACTURE OF FRONT FORK BLANK OF SINGLE UNIT TYPE FOR BICYCLES

BACKGROUND OF THE INVENTION

The present invention relates to the method for the manufacture of a front fork blank of the single unit type for use in bicycles, and more particularly to the oil hydraulic bulge-forming process by means of a sectional forming die of top and bottom molds in which a tubular ferrous blank is used as a starting material.

Generally speaking, the known front fork has been heretofore manufactured by the assembling process wherein a fork crown with a hole into which a fork stem is firmly fixed, and two legs or blades are secured to the underside holes of the fork crown, respectively. The fork crown consists of four parts, stem, crown, and two blades.

In this age of resources saving, manpower saving, and energy saving, in the bicycle parts industry, the introduction of a process for the manufacture of a bicycle part which aims at saving the above factors should be preferred as the first and foremost priority. Of the four parts comprising the front fork, the crown has heretofore been manufactured by the two processes as follows: (1) Process for making the crown by metal casting in a mold which corresponds to the contour of the crown; and (2) Making the crown by blanking a steel sheet to the required size, subjecting the blanked sheet to several drawing steps by means of a press machine, and finally welding it to form a desired crown article.

Therefore it is seen that the mass production of the front fork on an inexpensive cost basis will not be expected. However, in accordance with the oil hydraulic bulge-forming process disclosed in U.S. Pat. No. 4,051,704 (patented Oct. 4, 1977) invented by the colleague, Senkichiro Kimura of the same factory to which I also belong, the front fork blank of the single unit type of this invention can be manufactured from a straight tubular ferrous blank by bending it into a two-prong fork, and subjecting the thus formed fork to the oil hydrualic bulge-forming process.

The oil hydrualic bulge-forming process which comprises subjecting a metal tubular stock set in a die to a high pressure working oil in order to make a protuberant component expand, namely, bulge on the metal tubular stock is now known in industry, but at first it was considered incredible even by professors of metallurgy of the university.

SUMMARY OF THE INVENTION

In summary, in accordance with a preferred embodiment of the prsent invention, this invention comprises a preparatory series of mechanical working steps, namely, reducing both end portions of the straight tubular ferrous starting material to taper tubular forms, respectively, deforming the circular section of the balance of the tubular material to an elliptic section, deforming again only the middle portion of the elliptic section to a recessed form, and bending the straight tubular material to form a fork with two prongs or blades; and subjecting the fork material set in a sectional forming die to the bulge-forming process in order to form a socket for receiving a stem on the top of the fork material.

An object of the invention is to provide an improved method for the manufacture of a front fork of the single unit type for bicycles by the application of the oil hydraulic bulge-forming process, whereby the manufacturing process can be considerably accelerated.

Another object of the invention is to provide an improved method for making a front fork of the single unit type, whereby a considerable reduction of manufacturing cost as well as an assembly work can be attained.

A further object of the invention is to provide an improved method and apparatus for carrying out the principles of the invention.

BRIEF DESCRIPTION OF THE DRAWINGS

The invention will be more fully described with reference to the accompanying drawings, in which:

FIG. 1 is a schematic view of a tubular starting material of this invention showing a longitudinal welded seam in a dotted line.

FIG. 2 is a side view of the tubular material showing its middle portion deformed to an elliptic secton (see FIG. 6) and both end portions deformed to a taper form, respectively.

FIG. 3 is also a side view of the tubular material showing the middle portion of its length having the elliptic section deformed as shown in FIG. 7 in which the upper side portion of the ellipse parallel to its longer diameter is concaved.

FIG. 4 is a front view of a front fork raw material bent and formed from the straight tubular material shown in FIG. 3.

FIG. 5 is a sectional view along the line 5—5 of FIG. 2.

FIG. 6 is a sectional view along the line 6—6 of FIG. 2.

FIG. 7 is a sectional view along the line 7—7 of FIG. 3.

FIG. 8 is a perspective view of a front fork finished article with a stem fixed thereto.

DESCRIPTION OF THE PREFERRED EMBODIMENT

Figure 9:
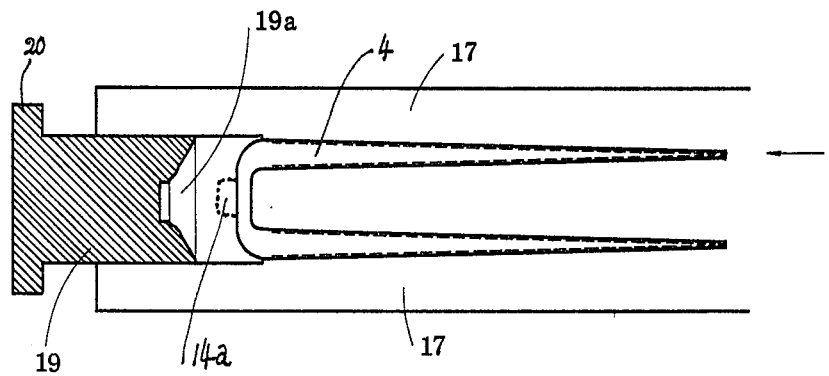
FIG. 9 is a schematic view of a bottom mold of a sectional forming die in which the front fork blank is loaded, and a mandrel is inserted into the opening of the die.

The starting material of this invention is a welded steel pipe 1 with a welded seam 1a shown in FIG. 1. The welded steel pipe is available in the market, the steel of which contains 0.12% C, 0.35% Si, 0.25–0.60% Mn, 0.040% P, and 0.040% S maximum, respectively, and the remainder Fe. Its physical properties, tensile strength 32–42 kg./mm.$^2$, elongation 30–40%, and Brinell hardness 80–120.

As regards the welding method of the welded steel pipe, any welding, such as, electric resistance welding, forge welding, gas welding, and arc welding may be applied, but spiral seam welding is not preferred. In loading the welded pipe blank into the sectional die, attention should be paid that the welded seam 1a is placed outside area where a protuberant component is to be bulge-formed.

The seamless pipe produced by Mannesmann or Stiefel process may be used as the tubular material. In charging it into the die, no attention may be paid to the welded seam, but there is a disadvantage due to a higher cost than that of the welded pipe.

A preferred embodiment of this invention will be described in connection with the accompanying drawings. The welded pipe 1 with a welded seam 1a in FIG. 1 is used as the starting material. The length of the pipe 1 is, for example, 90 cm. for the front fork of the adult use wherein the length of one of the two identical blades if 40 cm., respectively, while that of a crown 10 cm., and its outer diameter 22.2–23.4 mm. and the thickness of its pipe wall 1.4–1.8 mm. It is understood that the above size is not limited.

The welded pipe 1 is treated by the Bonderite process to coat it with the Bonderite film before it is subsequently worked. It has been found that no other coating than the Bonderite film is required, because it works as a good lubricant for bulge-forming and subsequent working.

The tubular material coated with the Bonderite film is subjected to a series of deforming working steps. At first, as shown in FIG. 2 a tubular material 2 is deformed such that its both ends 2b, 2c are formed to a taper shape, the section of both ends is also circular, but gradually reduced in size. The taper shape extends in the range of $\frac{1}{2} \sim \frac{3}{4}$ of 45 cm., half of 90 cm., the whole length of the material. The outer diameter, 22.2–23.4 mm. of the tubular material is gradually reduced in size as much as its half, for example, about 12 mm. at the end of end portions 2b, 2c by means of, for instance, rotary taper swaging machine of a known construction.

In the second deforming step, the circular section of the middle portion of the tubular material 2 covering about 25–45 cm. in length of the material 2 except the taper portions thereof is deformed to an elliptic section of, for example, longer diameter 28 mm., and shorter diameter 20 mm. by the known press machine, or may be deformed to an oval section as desired.

FIG. 2 shows the side view of the tubular material 2 in which it has two taper ends of circular section (FIG. 5) at both ends 2b, 2c while its middle portion 30a shows its side view of the ellipse along its longer diameter. In carrying out the above first and second deforming steps, no attention may be paid no matter where the welded seam 1a may be.

However, in the third deforming step, it is required that the welded seam 1a of the tubular material 2 of FIG. 3 is so placed that the seam 1a should be in contact with the horizontal plane of a working bed, in other words, the position of the seam 1a lies downwards. With the position of the seam 1a of the tubular material 2 placed downwards on the working bed, the middle portion covering about 12 cm. in length of the material 2 is subjected to the third deforming step in order to deform its section to a concave ellipse as shown in FIG. 7, in other words, the upper elliptical side only is recessed, and the lower side thereof remains as its elliptical side.

FIG. 3 shows a side view of the tubular material 3 wherein its middle portion 3a is recessed. It is understood that the tubular material 2 of FIG. 2 is turned about 90°, placed to such a position as shown in FIG. 3, and the middle portion 3a, 12 cm. in length is deformed by the known machine to the section of the concave ellipse as shown in FIG. 7. It is also understood that the tubular material 3 is so worked that the concave recess of the elliptical section faces upwards on the working bed, in other words, the welded seam 1a is in contact with the same bed. The tubular material 3 of FIG. 3 has two cylindrical ends of the taper form while the section of its middle portion is of a deformed ellipse, namely, recessed ellipse. It is known that the ellipse has two diameters, long and short. If FIG. 3 shows the side view of the tubular material 3 relative to the shorter diameter of the ellipse, it is understood that FIG. 3 is seen somewhat exaggerated.

In the fourth deforming step, the front fork material 4 of the single unit type which has two blades 2b, 2c and a crown portion 3a shown in FIG. 4 is manufactured by bending both end portions 2b, 2c of the straight tubular material 3 of FIG. 3 with the concave ellipse of the crown 3a facing upwardly, in other words, in the opposite direction to that of blades 2b, 2c. It is also noted that the welded seam 1a of the tubular material 3 should face downwardly.

With reference to the bending work in which the straight pipe is bent at two places to form a fork shape with two prongs or blades, it is done by the known method and machine. In bending, a step for bending one blade first, and another step for bending another blade may be carried out, or a single step for bending two blades simultaneously may be preferred. Mechanical deforming and forming steps of the present invention end here.

The fifth step of this invention, one of the features of the invention lies in the bulge-forming process, the schematic view of which is shown in FIG. 9, and it will be described in detail hereinbelow.

FIG. 9 shows a sectional forming die used for the oil hydraulic bulge-forming process, and its ancillary apparatus is eliminated. The oil hydraulic bulge-forming press machine which utilizes the introduction of the high pressure working oil for the purpose of bulge-forming a protuberant component on the tubular material is disclosed in U.S. Pat. No. 4,051,704 (Oct. 4, 1977), "Method for the manufacture of an ornamental head lug of the single unit type for use in bicycles" invented by S. Kimura, one of the members of the bicycle parts manufacturing factory, to which I also belong. The production of the above tubular bicycle parts by the bulge-forming process was considered infeasible at the very beginning, but mass production of the tubular products for various bicycle parts by the bulge-forming process has been in full swing for the past several years. It is known that the bulge-forming press machine is provided with an oil supply pump, a high pressure pump, several reciprocating rams, and other accessories, etc.

The tubular material 4 (FIG. 4) with the pair of blades 2b, 2c formed by the above series of deforming work steps is set in the bottom mold 17 of the sectional forming die 10 (FIGS. 9–10), on which the top mold 18 is closely placed. It is understood that the sectional forming die 10 consists of top mold 18 and bottom mold 17. The bottom mold 17 is firmly fixed on the bed of the bulge-forming press machine and the top mold 18 is secured to the mold 17 wherein fasteners therefor are eliminated for the brevity of description and not shown in the drawing.

Figure 10:
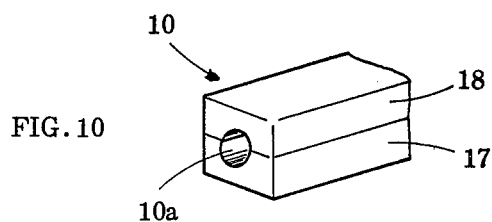
FIG. 10 is a schematic view of the sectional forming die with the opening into which the mandrel is to be inserted.
Figure 11:
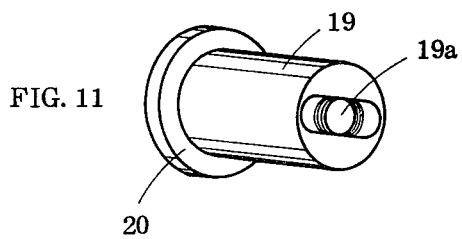
FIG. 11 is a schematic view of the mandrel with a concave recess which corresponds to the top of the front fork blank.

The sectional die 10 is provided with an opening 10a at its end as shown in FIG. 10, and a mandrel 19 shown in FIG. 11 is so designed that it is able to insert into the opening 10a. The mandrel 19 has a flange 20 at its one end while a concave recess 19a is formed at its other end. The concave recess 19a corresponds to the contour of a socket 14a of stem 13 (FIG. 8), in other words, the socket 14a exists as a male die while the recess 19a does as a female die. The height of the protuberant socket 14a is in the range of about 5-10 mm.

The tubular material 4 has two tubular blades 2b, 2c, so there is a hollow void from one end of the one blade through the middle 3a to the other end of the other blade. Thus, the working fluid, such as, oil for bulge-forming can be introduced at the atmospheric presure into the one end opening of the blade in the direction of an arrow as shown in FIG. 9 with the other end opening of the other blade closed in order to fill the tubular material 4 in the die 10 with the fluid or oil which is replaced by the air. Then both end openings are tightly closed. Thereafter, as soon as the pressure working fluid or oil with the pressure value of 950-1200 kg./cm.$^2$ is forced into one end opening or two end openings, simultaneously the mandrel 19 with the recessed female die 19a is also forced into the opening 10a of the sectional die 10 to impinge on the middle top 3a of the tubular material 4 in order to bulge-form the socket 14a shown in a dotted line on the middle of the top 3a of the tubular material 4 by the force of the high pressure working oil or by the important feature of the oil hydraulic bulge-forming process. The height of the socket 14a can be bulge-formed as desired in the range of 5-10 mm.

Now, let us consider the condition of the right-angled bent corner of two blades of the tubular material 4. Generally speaking, when a straight tubular material is bent to form a right-angled corner, it is seen that the outer wall of tube bends itself relatively large while the inner wall thereof bends itself relatively small. In other words, the thickness of the tubular material corresponding to its outer tubular wall is thinner than that of its inner tubular wall, because the outer tubular wall stretches and extends much larger than the inner tubular wall. Namely, the outer tubular wall draws a larger curve than that of the inner tubular wall.

If the strength of the tubular material depends on the thickness of its tubular wall, it follows that the strength of the tubular material at its bent corner may be more or less influenced by the difference of thickness of its outer and inner walls.

In accordance with the bulge-forming process of this invention, however, I have found that the metallic component in the vicinity of the bulge-formed portion is so concentrated that the metallic structure becomes highly dense to increase its strength. Thus, the metalic structure in the vicinity of the socket 14a bulge-formed by the process of this invention is made so dense that even the bent corner increases its strength. At the same time, the recess 19a of the mandrel 19 is pressed closely to two bent corners of the top of the tubular material 4 with two blades as well as the top itself in order to help bulge-form the socket 14a at the top of the material 4.

In view of the practical experience of the bulge-forming process for the past years, it seems that there happens such a phenomenon as dislocation or transition in the vicinity of the area of the metal subjected to deformation resulting from bulge-forming and it results in the formation of the metal structure with the increase of strength at the bent corners of a front fork material. The front fork material thus manufactured by the bulge-forming process from the straight tubular material is an unfinished fork product, from which a finished front fork article 12 as shown in FIG. 8 is obtained. The front fork article 12 consists of stem 13, socket 14a, crown 14 integral with the blades, two blades 15, 16, and fork ends 15a, 16a shown in FIG. 8. It is understood that the above completed front fork article can be manufactured from the front fork material released from the sectional die by the known working step, such as, making an open mouth of socket, inserting a stem, making fork ends, and other finishing work.

While a specific embodiment of the invention has been shown and described in detail to indicate the application of the principles of the invention, it will be understood that the invention may be embodied otherwise without departing from such principles.

I claim:

1. Method for the manufacture of a front fork material of the single unit type for use in bicycles from a straight tubular ferrous blank as a starting material by an oil hydrualic bulge forming press machine provided with a sectional forming die, a vertically reciprocating a hydraulic ram, a pair of horizontally opposed and reciprocating rams, all of said rams are driven by the oil hydraulic pressure, the improvement which comprises (1) reducing both end portions of said straight tubular ferrous blank having said circular section to a tubular taper form having a gradually smaller circular section, respectively;

(2) deforming the balance of said tubular material other than said tubular taper portions to a tubular material having an elliptic section;

(3) deforming only one of two arcuated sides of said elliptic section parallel to its longer diameter of the middle portion of said tubular material covering about 12 cm. in length to a concave side;

(4) bending said two end portions of said straight tubular material relative to said middle portion of about 12 cm. in length as its top in the said direction and and in the same plane to form a fork material having two parallel prongs or blades; said concave side facing upwardly in the upward direction opposite to the downward direction of said blades;

(5) providing an opening at one end of said sectional forming die and a mandrel with a recess designed to match with a protuberant to be bulge-formed on said middle portion of said tubular material, said mandrel being able to insert into said opening of said die;

(6) inserting said tubular material with said bent blades into said sectional die designed to bulge-form said protuberant component on said middle portion of said tubular material;

(7) subjecting said tubular material in said die to the combined load of a vertical compressive load of said vertical ram, an axial compressive load applied to both ends of said tubular material by said horizontal rams, and a high pressure oil supplied into the interior of said tubular material from both ends of said tubular blades; and (8) simultaneously forcing said mandrel into said opening of said sectional die to tightly contact on the middle of said tubular material help to bulge-form said protuberant component on the middle of said tubular material, said protuberant component being opened for use in a socket which receives a stem of said front fork material.

2. Method as claimed in claim 1 wherein said tubular ferrous material for adult use in a steel pipe about 90 cm. in length, 22.2-23.4 mm. its outer diameter, and 1.4-1.8 mm. in its thickness, and the analysis thereof is less than 0.12% C, 0.35% Si, 0.25-0.60% Mn, 0.040% P, and 0.040% S maximum, respectively, and the remainder Fe, and the property thereof is tensile strength 32-42 kg./mm.², elongation 30–40%, and Brinell hardness 80–120.

3. Method as claimed in claim 1 wherein half of the length of said straight tubular material is made to a gradually reducing taper form in the range of ½–¾ in length, and both foremost ends are reduced in the diameter thereof to about half of the original diameter of said tubular material.

4. Method as claimed in claim 1 wherein the longer diameter of an ellipse of said elliptical section is, for example, about 28 mm. and the shorter diameter is about 20 mm.

* * * * *